United States Patent Office 3,337,491
Patented Aug. 22, 1967

3,337,491
PROCESS OF TREATING A FILLER WITH PHOSPHORUS OR PHOSPHORYL TRIISOCYANATES PRIOR TO ADDITION TO POLYURETHANE
William Ian Williamson, Manchester, England, assignor to Imperial Chemical Industries Limited, London, England, a corporation of Great Britain
No Drawing. Filed Nov. 9, 1965, Ser. No. 507,056
Claims priority, application Great Britain, Feb. 26, 1962, 7,366/62
2 Claims. (Cl. 260—37)

This application is a continuation in part of application Ser. No. 259,421 filed Feb. 18, 1963, and is concerned with an invention relating to coating compositions.

It is well known to prepare polyurethane coating compositions in the form of isocyanate group-containing urethane prepolymers by reacting organic polyisocyanates with hydroxyl group-containing materials such as polyesters, polyesteramides or polyethers. Coatings may be prepared from these compositions by applying them to a substrate and allowing them to cure by reaction with atmospheric moisture. This reactivity of the prepolymers towards water presents storage stability problems particularly in the case of pigmented compositions since the pigments themselves commonly have sufficiently high moisture contents to cause gelation of the prepolymers within a very short space of time.

In order to improve the storage stability of pigmented polyurethane coating compositions, several methods have been proposed for removing the adsorbed moisture from the pigment before the latter is added to the prepolymer. Methods that have been proposed include oven drying and pre-treatment of the pigment with a proportion of the prepolymer, but these methods have not been entirely suitable.

It has now been found that moisture-curable pigmented polyurethane coating compositions of excellent stability may be obtained by drying the pigment by bringing it into contact with phosphorus triisocyanate or phosphoryl triisocyanate.

Thus according to the present invention there is provided an improved process for the production of moisture-curable pigmented polyurethane coating compositions by mixing a pigment with an isocyanate group-containing urethane prepolymer, wherein the pigment is dried by bringing it into contact with phosphorus triisocyanate or phosphoryl triisocyanate, the latter compound being particularly suitable for the process of the present invention.

The phosphoryl triisocyanate or phosphorus triisocyanate is normally employed in such molecular proportions as to provide from 0.9 to 2.0 and preferably 1.0 to 1.2 isocyanate groups per mole of water present in the pigment. Larger or smaller amounts may be used if desired, but larger proportions may not lead to any additional advantage and smaller proportions may produce an effect inadequate for most technical requirements.

The treatment of the pigment with the phosphorus-triisocyanate or phosphoryl triisocyanate is conveniently carried out by milling the two materials in the presence of a suitable solvent. Suitable solvents include esters and ketones containing negligible amounts of alcohols, water and other isocyanate-reactive materials. Examples of such solvents are Cellosolve acetate, methyl ethyl ketone and methyl iso-butyl ketone. Aromatic solvents may also be used as solvents or diluents. Examples of suitable aromatic solvents include xylene, toluene and Aromasol H.

If desired, the treatment of the pigment can be performed in this manner to dry it, and the resultant mixture is then mixed with the isocyanate group-containing polyurethane prepolymer. However, it has been found, most surprisingly, that the rates of reaction of phosphorus triisocyanate and phosphoryl triisocyanate with water are so much faster than organic isocyanate compounds that the drying of the pigment can even be carried out during compounding of the pigmented polyurethane coating composition, without substantial effect upon the free isocyanate groups of the polyurethane prepolymer. Thus in the preferred method of carrying out the invention, the phosphorus triisocyanate or phosphoryl triisocyanate is added to a solution of the polyurethane prepolymer, the pigment is then added, and the composition is then milled in the usual manner to obtain a uniform dispersion.

Pigments which may suitably be used in the production of the coating compositions of this invention include inorganic pigments, for example, titanium dioxide, iron oxides, chromes and carbon black and organic pigments, for example, phthalocyanines and azo compounds.

The isocyanate group-containing urethane prepolymers may be prepared by methods fully described in the prior art. Thus, suitable prepolymers may be prepared by the reaction of an organic polyisocyanate with hydroxyl group-containing materials.

As examples of polyisocyanates suitable for the preparation of prepolymers there may be mentioned tolylene-2:4- and 2:6-diisocyanates, diarylmethane diisocyanates, for example diphenylmethane diisocyanates, m- and p-phenylene diisocyanates, chlorophenylene-2:4-diisocyanate, 2:4:6-toluene triisocyanate or mixtures thereof. The polyisocyanates may be partially polymerised or may be modified by treatment with glycols such as ethylene and diethylene glycols, and polyhydric alcohols such as thimethylolpropane and glycerol.

Suitable hydroxyl group-containing materials include hydroxyl group-containing polyesters, polyesteramides and polyethers. The polyesters of polyesteramides are made from polycarboxylic acids and polyhydric alcohols and, as necessary, polyfunctional aminoalcohols or polyamines. Suitable polybasic acids include succinic, glutaric, adipic, suberic, azelaic and sebacic acids as well as aromatic acids such as phthalic isophthalic and terephthalic acids. Mixtures of acids may be used. Examples of glycols are ethylene glycol, 1:2-propylene glycol, diethylene glycol, tetramethylene glycol, pentamethylene glycol, hexamethylene glycol, decamethylene glycol and 2:2-dimethyltrimethylene glycol. Mixtures of glycols may be used, and polyhydric alcohols, such as hexanetriol, trimethylolpropane, trimethylolethane, pentaerythritol or glycerol may be included in varying amounts according to the hardness desired for the final coating. Examples of polyamines and polyfunctional amino-alcohols include ethylene diamine, hexamethylene diamine, monoethanolamine, phenylene diamines and benzidine.

As examples of polyethers there may be mentioned hydroxyl-ended polymers or copolymers of cyclic ethers, and especially of ethylene oxide, propylene oxide, epichlorhydrin oxacyclobutane and substituted oxacyclobutanes and tetrahydrofuran. Such polyethers may be linear polyethers as are prepared, for example, by the polymerisation of an alkylene oxide in the presence of a glycol initiator. Alternatively, there may be used branched polyethers prepared, for example, by polymerising an alkylene oxide in the presence of a substance having more than two active hydrogen atoms, for example glycerol and pentaerythritol.

In the preparation of the isocyanate group-containing urethane prepolymers from organic polyisocyanates and hydroxyl group-containing materials the components may suitably be reacted together at elevated temperatures, reaction temperatures of from 70° C. to 90° C. being convenient. If desired, low molecular weight polyols may be included in the reaction mixture. Suitable polyols include diols, for example 1:3-butylene glycol and triols, for example trimethylolpropane.

The coating compositions of this invention may also contain other adjuvants commonly employed in the art, for example solvents and flowing out agents such as ethyl cellulose and cellulose acetobutyrate. The coating compositions may be applied to a wide variety of substrates, for example wood, metals, concrete, asbestos, paper, plastics, rubber, glass and fabrics by any of the conventional means, for example brushing, spraying dipping and the like.

The invention is illustrated but not limited by the following examples in which parts and percentages are by weight.

Example 1

100 parts of oven-dried Rutiox C.R. titanium dioxide and 120 parts of a 4/1 mixture of urethane grade β-ethoxyethyl acetate and xylene were mixed with 1 part of water. Four such mixtures were prepared, one being employed as a blank and the other three being mixed with various amounts of phosphoryl triisocyanate as indicated in the following table. After milling with phosphoryl triisocyanate for approximately three hours, coating compositions were prepared by slurry grinding the pigments with portions of an isocyanate group-containing urethane prepolymer prepared by reacting 1 mole of polypropylene glycol of molecular weight 1000, 1 mole of 1:3-butylene glycol, 2 moles of trimethylolpropane and 8 moles of an 80/20 mixture of tolylene-2:4- and 2:6-diisocyanates at 80° C. for 6 hours. Mixtures were prepared in the ratio of 10 parts of titanium dioxide to 1 part of prepolymer and when fully dispersed the pigment/prepolymer ratio was adjusted to 0.8/1.

The pigmented coating compositions were then stored at a temperature of 20° C. and a relative humidity of 60–65%. Viscosity measurements at 20° C. in a No. 4 Ford cup were carried out initially and after the periods of time stated in the following table wherein the shorter flow times indicate the lower viscosities.

|  | Parts phosphoryl triisocyanate per 100 parts of pigment | | | |
| --- | --- | --- | --- | --- |
|  | 0 | 2.2 | 3.3 | 4.4 |
| Initial viscosity | 22 secs | 24 secs | 23 secs | 23.5 sels |
| Viscosity after— | | | | |
| 1 month | Gel | 90 secs | 36 secs | 25 secs |
| 3 months | | Gel | 50 secs | 30 secs |
| 6 months | | | 60 secs | 40 secs |

The table shows that the storage stability of pigmented polyurethane coating compositions prepared from a pigment having a moisture content of 1% is improved by pretreating the pigment with phosphoryl triisocyanate, a compound containing three isocyanate groups directly attached to a phosphorus atom. The improvement becomes particularly noticeable when at least 3.3% of phosphoryl triisocyanate is used (i.e., molecular proportions of approximately one isocyanate group per mole of water).

Example 2

100 parts of Tioxide R–CR titanium dioxide containing 1% of moisture, as determined by heating in an oven at 120° C. for 4 hours, were mixed with 150 parts of urethane grade β-ethoxyethyl acetate. Four such mixtures were prepared, one being employed as a blank and the other three being mixed with various amounts of phosphorus triisocyanate (25% solution in butyl acetate) as indicated in the following table.

After milling with the phosphorus triisocyanate for approximately three hours, coating compositions were prepared by slurry grounding the pigments with portions of an isocyanate group-containing urethane prepolymer prepared by reacting 1 mole of polypropylene glycol of molecular weight 1000, 1 mole of trimethylolpropane and 4 moles of an 80/20 mixture of tolylene-2:4- and 2:6-diisocyanates at 80° C. for 6 hours. Mixtures were prepared in the ratio of 10 parts of titanium dioxide to 1 part of prepolymer and when fully dispersed, the pigment prepolymer ratio was adjusted to 0.6/1.0.

The pigmented coating compositions were then stored at a temperature of 20° C. and a relative humidity of 50–55%. Viscosity measurements at 20° C. in a No. 4 Ford cup were carried out initially and after the periods of time stated in the following table wherein the shorter flow times indicate the lower viscosities.

|  | Parts phosphorus triisocyanate (P(NCO)₃) per 100 parts of pigment | | | |
| --- | --- | --- | --- | --- |
|  | 0 | 3.0 | 3.3 | 3.6 |
| Initial viscosity | 100 secs | 50 secs | 50 secs | 50 secs |
| Viscosity after— | | | | |
| 1 month | Gel | 100 secs | 60 secs | 51 secs |
| 2 months | | Gel | 65 secs | 52 secs |
| 3 months | | | 66 secs | 52 secs |
| 6 months | | | 70 secs | 55 secs |

Example 3

For tinting purposes, master batches were prepared from the following pigments: carbon black, red iron oxide, Phthalocyanine Blue, Toluidine Red, and a Hansa Yellow, by slurry grinding with phosphoryl triisocyanate and urethane grade β ethoxyethyl acetate for three hours. The slurry was then fully dispersed by milling overnight with a quantity of an isocyanate group-containing urethane prepolymer prepared by reacting 8 moles of adipic acid with 7 moles of ethylene glycol and 3 moles of propylene glycol, and treating the resultant polyester with 1.33 equivalents of 80/20 tolylene diisocyanate calculated on the hydroxyl content of the polyester.

The following table illustrates the quantities of each component involved:

| Pigment | Parts of pigment | Percent mositure in pigment | Parts of urethane grade Cellosolve acetate | Parts of phosphoryl triisocyanate (PO(NCO)₃) | Parts of 100% prepolymer |
| --- | --- | --- | --- | --- | --- |
| Carbon black | 10.0 | 1.5 | 100 | 0.6 | 1.0 |
| Red iron oxide | 75.0 | 0.5 | 100 | 1.5 | 7.5 |
| Phthalocyanine blue | 30.0 | 1.0 | 100 | 1.3 | 3.0 |
| Toluidine Red | 40.0 | 1.0 | 100 | 1.6 | 4.0 |
| Hansa Yellow | 35.0 | 1.0 | 100 | 1.4 | 3.5 |

The resultant pigment pastes were found to be stable over a period of six months with no signs of gelation.

The above stainers gave stable dispersions when blended with the white paints of the previous examples with no signs of gelation over a period of six months.

Example 4

An isocyanate-ended polyurethane prepolymer is prepared by heating a mixture of 1 mole of 1,2-butylene glycol, 2 moles of trimethylolpropane and 8 moles of a 4:1 mixture of tolylene 2,4- and 2,6-diisocyanates at 80° C. for 6 hours.

A number of pigmented polyurethane compositions are prepared by the following method:

100 parts of Tioxide R–CR titanium dioxide containing 0.7% by weight of water (as determined by loss of weight on heating at 120° C. for 4 hours) are mixed with 150 parts of a 4:1 mixture of 4-methoxy-4-methylpentan-2-one and xylene containing 0.2% by weight of water. 20 parts of the polyurethane prepolymer and the appropriate amounts of phosphorus or phosphoryl triisocyanate are added. The mixture was allowed to stand for 30 minutes in a loosely-capped milling container to allow the evolved carbon dioxide to escape, then the container was sealed and the contents milled for 18 hours.

180 parts of the prepolymer are then added and mixed well with the dispersion, and the mixture is transferred to screw-topped solvent cans having an inner seal and stored at 20° C. in an atmosphere of relative humidity of 60–65%. Viscosity measurements were carried out at 20° C. in a No. 4 Ford cup at periods as stated in the tables A and B.

To illustrate the advantage of using phosphorus and phosphoryl triisocyanates rather than commonly-available organic diisocyanates, the same procedures were carried out using tolylene diisocyanate and diphenylmethane-4,4'-diisocyanate and the results are set out in Tables C and D.

TABLE A.—PHOSPHORUS TRIISOCYANATE

|  | Parts of $P(NCO)_3$ | | | |
| --- | --- | --- | --- | --- |
|  | 0 | 4.3 | 5.8 | 7.3 |
| Initial viscosity | 50 secs | 40 secs | 40 secs | 40 secs |
| Viscosity after— |  |  |  |  |
| 1 month | Gelled | 60 secs | 45 secs | 40 secs |
| 3 months |  | 80 secs | 50 secs | 41 secs |
| 6 months |  | 160 secs | 60 secs | 45 secs |

TABLE B.—PHOSPHORYL TRIISOCYANATE

|  | Parts of $PO(NCO)_3$ | | | |
| --- | --- | --- | --- | --- |
|  | 0 | 4.8 | 6.4 | 8.0 |
| Initial viscosity | 60 secs | 35 secs | 38 secs | 37 secs |
| Viscosity after— |  |  |  |  |
| 1 month | Gelled | 58 secs | 43 secs | 39 secs |
| 3 months |  | 85 secs | 52 secs | 40 secs |
| 6 months |  | 170 secs | 70 secs | 45 secs |

TABLE C.—TOLYLENE DIISOCYANATE

|  | Parts of T.D.I. | | | |
| --- | --- | --- | --- | --- |
|  | 0 | 7.5 | 10 | 12.5 |
| Initial viscosity | 55 secs | 50 secs | 50 secs | 50 secs |
| Viscosity after— |  |  |  |  |
| 1 month | Gelled | 190 secs | 180 secs | 175 secs |
| 3 months |  | Gelled | 260 secs | 260 secs |
| 6 months |  |  | 380 secs | 390 secs |

TABLE D.—DIPHENYLMETHANE DIISOCYANATE

|  | Parts of M.D.I. | | | |
| --- | --- | --- | --- | --- |
|  | 0 | 12 | 16 | 20 |
| Initial viscosity | 50 secs | 50 secs | 50 secs | 47 secs |
| Viscosity after— |  |  |  |  |
| 1 month | Gelled | 170 secs | 170 secs | 150 secs |
| 3 months |  | Gelled | 360 secs | 240 secs |
| 6 months |  |  | 500 secs | 380 secs |

The results indicate quite clearly the higher efficiency of the phosphorus based isocyanates over the organic isocyanates.

I claim:
1. A process for the production of moisture-curable pigmented polyurethane coating compositions wherein a pigment is treated in an organic solvent free from groups capable of reacting with an isocyanate group with a sufficient amount of a compound selected from the class consisting of phosphorus triisocyanate and phosphoryl triisocyanate to react with any water present in the pigment and solvent, and the mixture so obtained is admixed with a polyurethane containing a plurality of isocyanate groups.

2. A process for the production of moisture-curable pigmented polyurethane coating compositions which comprises mixing together a pigment, a polyurethane containing a plurality of isocyanate groups and an organic solvent free from groups capable of reacting with an isocyanate group, and also adding a sufficient amount of a compound selected from the class consisting of phosphorus triisocyanate and phosphoryl triisocyanate to react with any water present in the pigment and solvent.

References Cited

UNITED STATES PATENTS

| 2,449,613 | 9/1948 | Miller et al. | 260—22 |
| 3,144,302 | 8/1964 | Fielding | 23—14 |
| 3,196,026 | 7/1965 | Menard et al. | 106—287 |

OTHER REFERENCES

Payne: "Organic Coating Technology," John Wiley & Sons, Inc., New York, 1961, vol. 2, pp. 1354–1355.

JULIUS FROME, *Primary Examiner.*

MORRIS LIEBMAN, *Examiner.*

J. A. GAZEWOOD, H. S. KAPLAN, *Assistant Examiners.*